United States Patent [19]
Brilando

[11] 3,781,036
[45] Dec. 25, 1973

[54] SPEEDOMETER DRIVER FOR BICYCLE QUICK-RELEASE HUBS

[75] Inventor: Frank P. Brilando, Niles, Ill.

[73] Assignee: Schwinn Bicycle Company, Chicago, Ill.

[22] Filed: Nov. 6, 1972

[21] Appl. No.: 304,070

[52] U.S. Cl. .................................... 280/289, 74/12
[51] Int. Cl. ............................................ B62k 3/00
[58] Field of Search ................ 74/12; 280/289, 278, 280/287

[56] References Cited
UNITED STATES PATENTS
1,074,581  9/1913  Wessoleck ............................. 74/12
2,120,578  6/1938  Schulze ................................. 74/12

Primary Examiner—Richard A. Schacher
Attorney—James A. Davis et al.

[57] ABSTRACT

Speedometer driver for use on quick-release hubs of bicycles comprising a mounting bracket with a vertical part having a circular portion with a central axle-engaging aperture offset axially to clear the cup end of the hub shell and thin enough to permit mounting on the axle in place of usual washer between adjacent cone and lock nut as a permanent part of the quick-release hub, key means on the axle-engaging portion of bracket cooperating with keyway on axle, dished bearing ring nested into and secured to offset portion of bracket with inner diameter larger than outer diameter of cone, a stamped driving gear having annular hub rotatably mounted on bearing ring between marginal portion thereof and mounting bracket, and the latter having a shelf portion extending at right angles to rotatably support a cable-rotating fitting and a plastic pinion actuated by the driving gear.

3 Claims, 4 Drawing Figures

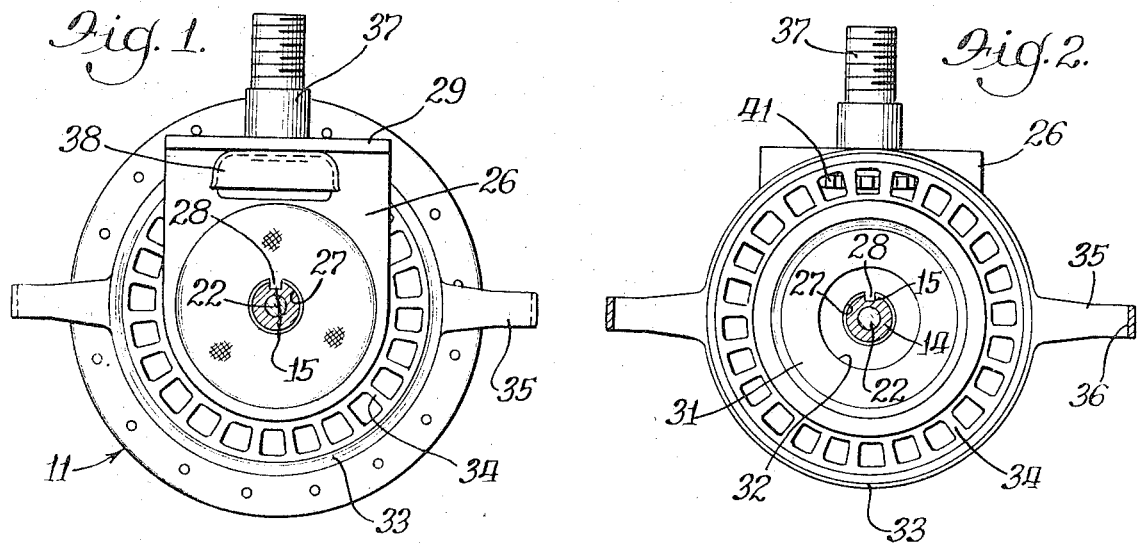
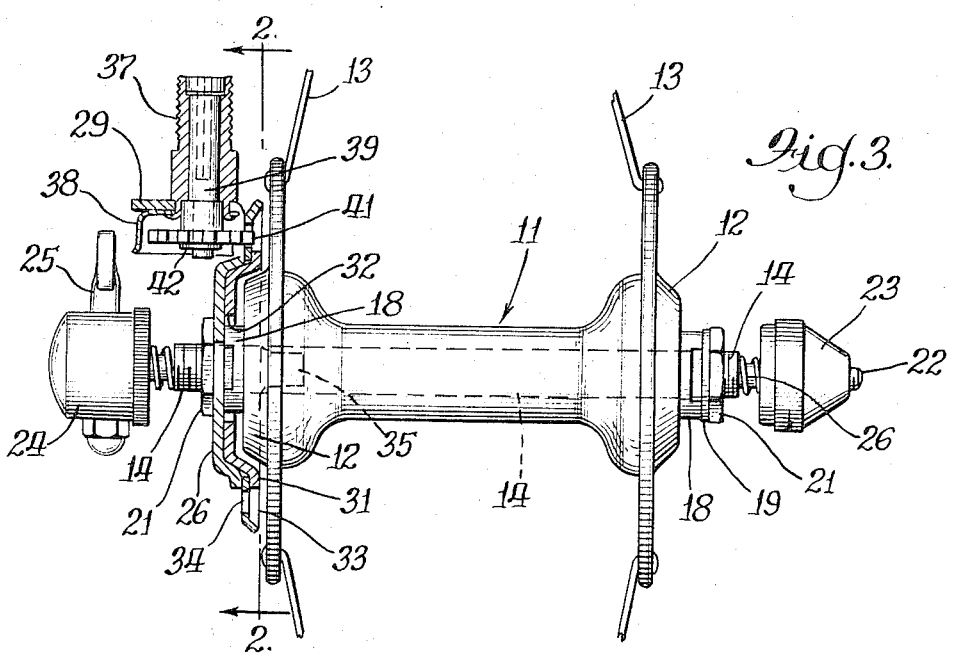
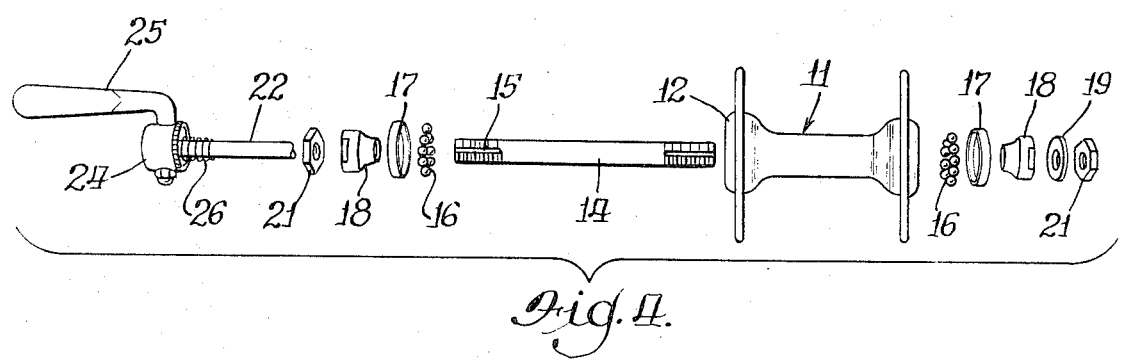

SPEEDOMETER DRIVER FOR BICYCLE QUICK-RELEASE HUBS

BACKGROUND OF THE INVENTION

1. Field of the Invention

This invention relates generally to bicycles, and more particularly to speedometers for use thereon.

2. Description of the Prior Art

Speedometer drivers for use on bicycles in the main have been relatively heavy and expensive, using machined housings and worm gears, for example, and have employed hub portions for mounting on the wheel axle which require an added axle length on the order of one-half inch. A recent driver has reduced the extra axle length required for its mounting to approximately half of that distance by using a mounting bracket and a driving gear of stamped sheet metal with a driven pinion of plastic, but even this design, like all other drivers, cannot be used on quick-release hubs because of the extra axle length it requires and its interference with the cup end of the hub shell.

SUMMARY OF THE INVENTION

This invention comprises an improved speedometer driver for use on quick-release hubs which employs a mounting bracket with a central axle-engaging portion offset axially to clear the cup end of the hub shell and thin enough to permit mounting on the axle in place of one of the usual washers between the adjacent cone and lock nut as a permanent part of the quick-release hub, a stamped driving gear being rotatably supported by the axle-engaging portion of the bracket and the latter having a shelf portion extending at right angles thereto rotatably supporting a cable-rotating fitting and a plastic pinion actuated by the driving gear.

IN THE DRAWINGS

FIG. 1 is an end elevation of a speedometer driver embodying the features of the invention as seen from the outside of the supporting wheel, with the wheel axle in section;

FIG. 2 is a vertical sectional view taken substantially on the line 2—2 of FIG. 3 and viewed from an opposite direction to that of FIG. 1;

FIG. 3 is an elevation view as seen from the right side of FIG. 1, with the speedometer driver shown in vertical section; and FIG. 4 is an exploded view of the quick-release hub and mounting stud unit.

Referring more particularly to FIGS. 3 and 4, reference numeral 11 indicates in general a quick-release hub comprising a shell with end cups 12 and supporting and having attached thereto the usual wheel spokes 13. This hub 11 includes a hollow axle 14 best seen in FIG. 4 as having outwardly threaded end portions, each with an axially extending keyway 15. The end cups 12 are rotatably supported on the axle 14 by bearings adjacent each end of the latter and each comprising ball bearings 16, a dust cap 17, a bearing cone 18 screwed onto the axle, a lock washer 19 and a lock nut 21.

The quick-release hub 11 also includes a quick-release unit in the form of a mounting stud or rod 22 extending axially through the hollow axle 14 and having adjustable retainer members on its ends comprising a nut 23 (FIG. 3) and an eccentric 24 movable relative to the stud 22 longitudinally thereof by a manually operable lever 25. The mechanism so far described comprises a well-known quick-release hub for a bicycle.

The present invention consists of a speedometer driver for use on and with such a quick-release hub. This driver comprises a mounting bracket having a vertical part 26 with an offset circular portion having a central aperture 27 slidable onto one end of the axle 14. This aperture 27 is formed with a tine or key means 28 extending radially inwardly thereof for cooperation with the associated keyway 15. Thus, when slid onto the axle 14 to its operative position of the drawings, the mounting bracket is retained on the axle by the associated lock nut 21 and is prevented from rotation relative to the axle by the engagement of the keyway 15 and key means 28. As will best be appreciated from FIGS. 3 and 4, this mounting bracket is substituted for the lock washer 19 normally incorporated in the quick-release hub at that end of the axle on which the driver is to be mounted. The mounting bracket also includes a shelf portion 29 perpendicular or normal to the vertical part 26 and extending outwardly therefrom.

A dished bearing ring 31 (FIG. 3) is nested into and secured to the offset circular portion 26 of the mounting bracket, the attachment of these two parts preferably being by spot welding, as illustrated in FIG. 1. The offsetting of the circular portion 26 and the inner part of the ring 31 is such that the latter will clear the adjacent shell end cup 12 when mounted on the hub as illustrated in FIG. 3. This bearing ring 31 has a central aperture 32 sufficiently large to insure the inner diameter being greater than the outer diameter of the adjacent cone 18. Therefore, so far as the space longitudinally of the axle which is required to accommodate the driver is concerned, the mounting bracket may be substituted for one of the lock washers 19. This eliminates any necessity of employing an axle or mounting stud of special length.

The circumferential portions of the circular offset part 26 of the bracket and the bearing ring 31 are spaced axially from each other to embrace and rotatably support an annular hub of a driving gear 33. Outwardly from this hub portion thus rotatably mounted on the bearing ring 31, the driving gear 33 is formed with circumferentially spaced apertures in a complete ring separated from each other to define radially disposed teeth 34 (FIGS. 1 and 2). The gear 33 also is provided with a pair of diametrically opposed arms 35 extending radially therefrom and terminating at their outer ends in laterally extending fingers 36 (FIG. 2) which are disposed between adjacent spokes 13 for driving engagement thereby when the speedometer driver is mounted on the hub. It is preferred that gear 33 be stamped from sheet metal.

The shelf portion 29 of the mounting bracket is apertured to receive a bearing member 37 (FIG. 3) the lower end of which is reduced in outer diameter and upset against the shelf 29 and the inner margin of a guard ring 38 to secure members 37 and 38 to the shelf 29. The bearing member 37 has a stepped bore for rotatably receiving a drive connector or cable-rotating fitting 39 and the hub portion of a driven pinion 41, the bore of the pinion and the lower end of the connector 39 having non-circular cross sections to prevent relative rotational movement thereof. The connector 39 is provided with a suitable circumferential groove for receiving a snap ring 42 which retains the connector 39 and pinion 41 in the bearing member 37. As will be understood, this connector 39 has a non-circular recess for receiving the lower end of a flexible cable which is connected at its upper end in well-known manner to a speedometer (not shown). The pinion 41 and fitting 39 preferably are made from a suitable plastic.

It also will be understood that the teeth on the pinion 41 are shaped to cooperate with and be drivingly engaged by the teeth 34 of the driving gear 33. With the arrangement heretofore described, this speedometer driver may be mounted on a quick-release hub without requiring any physical reconstruction of the latter, and this is unique in that previous speedometer drivers cannot be used in such a setting because of requiring an extra length for the axle and interference with the cup end of the hub shell.

It is thought that the invention and many of the attendant advantages will be understood from the foregoing description, and it will be apparent that various changes may be made in the form, construction, and arrangement of the parts without departing from the spirit and scope of the invention or sacrificing all of its material advantages, the form hereinbefore described being merely a preferred embodiment thereof.

I claim:

1. In a bicycle in combination with a quick-release hub having a shell with end cups, a hollow axle rotatably supporting said shell on bearings cooperating with said cups and retained thereon by a washer and a lock nut threaded onto each end of said axle, and a quick-release unit including a mounting stud extending axially through said axle and having adjustable retainer members on its ends; a speedometer driver, comprising a mounting bracket with a vertical part having an outwardly offset circular portion with a central aperture for receiving said axle and substituted for one of said washers, a dished bearing ring nested into and secured to said offset portion and spaced from and clearing the adjacent said end cup, a driving gear having an annular hub rotatably mounted on said bearing ring between the marginal portion thereof and said bracket, said bracket having a shelf portion normal to said vertical part, a bearing member extending therethrough and secured thereto, and a drivin pinion journaled by said bearing member and meshing with said driving gear.

2. In the combination of claim 1, wherein each end portion of said axle is provided with an axially extending keyway in its outer surface, key means on said offset portion of said bracket extending radially into said central aperture for cooperation with the associated said keyway.

3. The combination of claim 1, wherein said bearings include outer cones, and the inner diameter of said bearing ring is larger than the outer diameter of said cones.

* * * * *